United States Patent

Peters

(10) Patent No.: US 6,662,300 B1
(45) Date of Patent: Dec. 9, 2003

(54) SECURE PASSWORD PROVISION

(75) Inventor: Matthew Francis Peters, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,554

(22) Filed: Jun. 29, 1999

(30) Foreign Application Priority Data

May 8, 1999 (GB) ............................................. 9910572

(51) Int. Cl.$^7$ ................................................. H04L 9/00
(52) U.S. Cl. ..................... 713/182; 713/183; 713/187
(58) Field of Search ................. 713/182, 183, 713/187

(56) References Cited

U.S. PATENT DOCUMENTS

| | | | | |
|---|---|---|---|---|
| 4,349,695 A | * | 9/1982 | Morgan et al. | 340/5.8 |
| 5,596,748 A | | 1/1997 | Kleewein et al. | 395/610 |
| 5,661,807 A | * | 8/1997 | Guski et al. | 713/170 |
| 5,774,551 A | | 6/1998 | Wu et al. | 380/25 |
| 5,841,871 A | * | 11/1998 | Pinkas | 380/43 |
| 5,845,070 A | * | 12/1998 | Ikudome | 705/51 |
| 5,910,986 A | * | 6/1999 | Dove | 380/43 |
| 6,182,219 B1 | * | 1/2001 | Feldbau et al. | 380/258 |

FOREIGN PATENT DOCUMENTS

| | | | |
|---|---|---|---|
| JP | 8-249253 | 9/1996 | G06F/13/00 |
| WO | 99/01993 | 1/1999 | H04Q/7/00 |

OTHER PUBLICATIONS

"A Survey of Web Security", Aviel D. Rubin and Daniel E. Geer Jr., IEEE Computing, vol. 31, No. 9, pp 34–41, Sep. 1998.

* cited by examiner

*Primary Examiner*—Thomas R. Peeso
(74) *Attorney, Agent, or Firm*—Jeanine S. Ray-Yarletts

(57) ABSTRACT

The invention provides a method for providing, from a client computer across a network, a secure password to one or more remote computers. The method comprises the steps of: obtaining a string associated with an application on one of the or each remote computer; obtaining a password from a user of the client computer; combining the string and the password irreversibly to generate a secure password for the application; and providing only the secure password to the one remote computer.

8 Claims, 1 Drawing Sheet

SECURE PASSWORD PROVISION

FIELD OF THE INVENTION

The present invention relates to a method and apparatus operable within a client computer in a network for providing a secure password to a remote computer.

BACKGROUND OF THE INVENTION

More and more internet sites and applications are controlling access by asking for userids and passwords. As time goes by, users expect to acquire more userids, not less. At the same time, it is a well known problem that users accessing Internet sites may be prone to eavesdropping by third parties. Users are therefore encouraged to choose different passwords for different web sites or applications so that detection of a user's password on one site would not enable an eavesdropper to successfully use the same username and password on other sites or applications to which the eavesdropper believes the user has access.

Solutions to the problem of eavesdropping have been to implement one time passwordschemes. An example of such a scheme is Skey from Bellcore.

http://www.nic.surfnet.nl/surfnet/projects/surf-ace/mm-lab/security/skey.html

Such schemes rely on both the client and server having a copy of the user's password. Each time the client connects to the server, the server issues a different challenge. The password is combined with the challenge on both the client and server normally using some kind of hashing algorithm eg MD5. The client provides its result to the server and should the results match, the client is given access to the server. A different challenge is issued each time the client accesses the server, so that even if one password is detected by a third party, it is of no use in the future. It will be seen, however, that should the original password be seen when it is provided to the server, the client's security is compromised not only on one site but on any other site for which the user may use the same password.

The problem is therefore how to generate a different password for each site in such a way that the user can remember them all.

DISCLOSURE OF THE INVENTION

Accordingly, the present invention provides a method for providing across said network a secure password to one or more remote computers, said method comprising the steps of: obtaining a string associated with an application on one of the or each remote computer; obtaining a password from a user of said client computer; combining said string and said password irreversibly to generate a secure password for said application; and providing only said secure password to said one remote computer.

It should be seen that the term "client" is used to define any computer in communication with another computer. The invention is therefore applicable to, inter alia, a computer communicating in a peer-to-peer fashion with another computer, any type of computing device eg. a PDA, or an intermediate computer linking two other computers.

The term string is also used to define an input to a means for combining application associated information with the password. The string could, for example, contain a number as in the case of a TCP/IP address or any other form of suitable data.

The present invention provides a method and apparatus whereby a user has to remember only one password, but the password that is given to each individual Internet site, company or application is different, and no one site can work out the password given to other sites. This is both easy to use and secure for users.

BRIEF DESCRIPTION OF THE DRAWINGS

Embodiments of the invention will now be described with reference to the accompanying drawings, in which.

The invention is based on the premise that a user wishes to use a common userid and password for all sites and applications. For the purposes of simplicity, the term site will be used in the description, although it will be seen that any application can be adapted to employ the invention.

Figure 1:
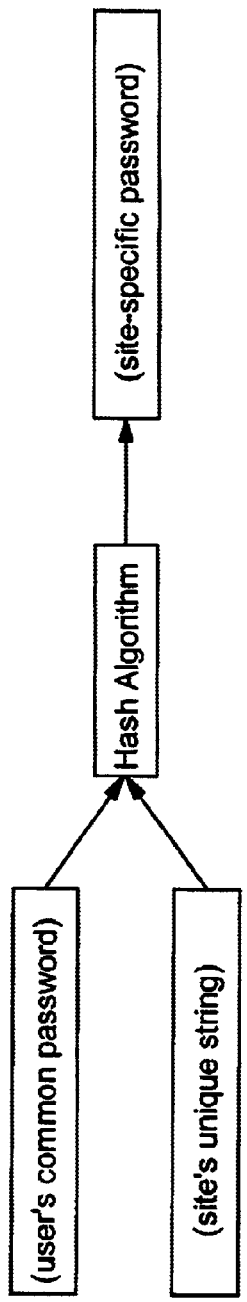
FIG. 1 illustrates the password generation component of the method according to the invention.

In general the invention operates at the point at which a user enters their password, both for the first time and subsequent times, where a site-specific password is constructed from the combination of two things:

1. the common password the user wants to use; and
2. some unique name or character string supplied by or related to the site, FIG. 1.

Preferably, a unidirectional algorithm, such as MD5, is used to construct this site-specific password, ie an algorithm where it is possible to compute the site-specific password from the common password and the site's unique string, but where there is no simple algorithm to recover the common password from the site's unique string and the site-specific password. This means that the information known to the site or possibly an eavesdropper is not enough to recover the user's common password.

DESCRIPTION OF THE PREFERRED EMBODIMENTS

The preferred embodiment is described in terms of an implementation for a web browser, giving some details of the way that current web browsers perform authentication, although the invention could be implemented similarly in other client software that implements authentication, for example, FTP and TELNET clients or even in general purpose applications.

The URL

An HTTP authentication scheme of particular interest works like this:

A client running a browser such as Netscape or Internet Explorer connects to a server hosting a site that requires authorisation;

The web server replies with a 401 (unauthorised) response. This response contains a WWW-Authenticate header which contains a 'realm' which is a simple quoted string. This realm defines a protection space; that is, a given userid and password should be valid for all pages within a realm.

Figure 2:
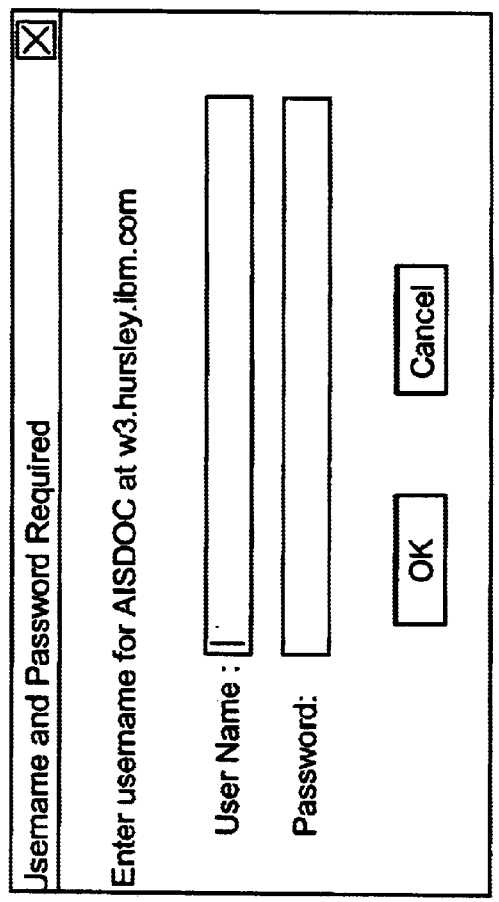
FIG. 2 illustrates a dialog box for accepting a user password in a web browser.

In response to receipt of a 401 response, the client now displays a dialog box displaying the realm and root URL, and inviting the user to enter a userid and password. FIG. 2, for example, shows a dialog box where AISDoc is the realm and w3.hursley.ibm.com is the root URL.

The user now enters a userid and password and the client creates a 'cookie' which comprises the userid and password pair as a base-64 encoded string. The client then includes this cookie in the credentials field of the Authorisation Header on each subsequent request for a page within this realm.

The preferred embodiment operates by altering the manner in which the cookie is formed in the final step above, by passing the password through an extra step to create a password specific to the given site and realm as shown in FIG. 1. Although this requires an alteration to the web browser or other client software, it does not require a change to HTTP or to the way Web servers work.

Preferably, the extra step comprises convolving the password with both the root URL (domain name) and the realm by a forward hash algorithm like MD5, before then combining the result with the userid to form the cookie. The net effect will be that although the user can enter just their common password, the client software will create a password which is unique to that realm, and from which the passwords for other realms cannot be deduced.

The invention differs from systems like OPIE and S/KEY, because the password generated according to the invention is not necessarily a one-time password. One-time passwords systems are intended to deal with the problem of snooping or eavesdropping on the network. Although the invention does mitigate this problem, since obtaining a userid and password pair by eavesdropping no longer enables an eavesdropper to access any of the other sites on which that given user has a userid. The invention also prevents rogue sites who are given the password generated according to the invention, from using the userid and password on other sites—something that cannot be prevented by one-time password systems, where the site is actually given the user's password.

It will be seen, however, that the invention could in fact be combined with a one-time password scheme. Here, the final cookie generating step of the client process would involve further convolving the site-specific password with a challenge sent by the web site each time the user accesses the web site. This is because once the site-specific password has been given to a web site, the web site can also apply the challenge to the password to see if it matches the password returned by the client. So not only are the client's other sites safe from a one-time eavesdropper, the site to which the eavesdropper listens is also safe from future attacks.

It will be seen that the invention is applicable to forms of web access other than HTTP and browsers: although other protocols like FTP and TELNET do not define a realm, it would still be possible to convolve a password with the domain name of a server to produce a password that would be unique for a site. Once again the best place to implement this change would be in the client software.

It would even be possible to include the invention in general purpose or dedicated applications running across a network where entry of a user password could possibly be intercepted by a third party, once again by making a minor alteration to the log-in process.

What is claimed is:

1. In a client computer in a network, a method for generating a secure password for enabling access across said network to applications on one or more remote computers, said method comprising the steps of:

obtaining a string associated with one of said applications on one of the or each remote computer;

obtaining a password from a user of said client computer;

combining said string and said password irreversibly to generate a secure password for accessing said application; and providing only said secure password to said one remote computer for enabling access to said one of said applications.

2. A method according to claim 1 further comprising the step of:

each subsequent time said client connects to said one remote computer:

obtaining a challenge from said one remote computer;

combining said secure password with said challenge to provide a one-time secure password; and providing said one-time secure password to said one remote computer.

3. Apparatus operable in a client computer in a network adapted to generate a secure password for enabling access across said network to applications on one or more remote computers, said apparatus comprising:

means for obtaining a string associated with one of said application on one of the or each remote computer;

means for obtaining a password from a user of said client computer;

means for combining said string and said password irreversibly to generate a secure password for accessing said application; and means for providing only said secure password to said one remote computer for enabling access to said one of said applications.

4. Apparatus according to claim 3 wherein said application is a web site and said application associated string comprises said one remote computer's domain name, said apparatus comprising an Internet web browser adapted to combine said domain name and said password irreversibly to generate a secure password for said web site.

5. Apparatus according to claim 4 wherein the application associated string further comprises said web site's realm, said web browser being adapted to irreversibly combine said realm and said domain name before irreversibly combining the combination with said password.

6. Apparatus according to claim 3 wherein said means for combining comprises a forward hash algorithm.

7. Apparatus according to claim 3 wherein said application is one of an FTP or a Telnet site and said application associated string comprises said one remote computer's domain name, said apparatus comprising an associated client adapted to combine said domain name and said password irreversibly to generate a secure password for said application.

8. A computer program product comprising computer program code stored on a computer readable storage medium for, when executed on a computing device, providing a secure password to one or more remote computers, the program code comprising means for performing the method as claimed in claim 1.

* * * * *